United States Patent [19]

Hüsing et al.

[11] Patent Number: 6,127,306
[45] Date of Patent: Oct. 3, 2000

[54] ORGANOFUNCTIONALIZED AEROGELS

[75] Inventors: Nicola Hüsing, Vienna; Ulrich Schubert, Wöllersdorf, both of Austria

[73] Assignee: Hoechst Research and Technology Deutscland GmbH & Co. KG, Frankfurt, Germany

[21] Appl. No.: 09/043,054

[22] PCT Filed: Sep. 12, 1996

[86] PCT No.: PCT/EP96/03999

§ 371 Date: Jul. 6, 1998

§ 102(e) Date: Jul. 6, 1998

[87] PCT Pub. No.: WO97/10178

PCT Pub. Date: Mar. 20, 1997

[30] Foreign Application Priority Data

Sep. 13, 1995 [DE] Germany .............................. 19533851

[51] Int. Cl.[7] ............................. B01J 31/00; B01J 21/08; C01B 33/12
[52] U.S. Cl. ........................... 502/158; 502/233; 423/338
[58] Field of Search ..................................... 502/405, 407, 502/233, 158; 423/338; 556/405, 414, 415, 417, 422, 428, 404

[56] References Cited

U.S. PATENT DOCUMENTS

| | | | |
|---|---|---|---|
| 4,190,457 | 2/1980 | McDaniel | 106/122 |
| 4,327,065 | 4/1982 | Von Dardel et al. | 423/338 |
| 4,402,927 | 9/1983 | Von Dardel et al. | 423/335 |
| 4,954,327 | 9/1990 | Blount | 423/338 |
| 5,275,796 | 1/1994 | Tillotson et al. | 423/338 |
| 5,565,142 | 10/1996 | Deshpande et al. | 252/315.2 |
| 5,647,962 | 7/1997 | Jansen et al. | 203/57 |
| 5,705,535 | 1/1998 | Jensen et al. | 521/64 |

FOREIGN PATENT DOCUMENTS

0653377 A1  5/1995  European Pat. Off. .

OTHER PUBLICATIONS

Derwent Publication, Week 9407, Oct. 26, 1993.
Derwent Publication, Week 9542, Jul. 25, 1995.

*Primary Examiner*—Steven P. Griffin
*Assistant Examiner*—Cynthia M Donley
*Attorney, Agent, or Firm*—Frommer Lawrence & Haug LLP

[57] ABSTRACT

The invention relates to aerogels containing functional residues of the formula (I)—Y—Z, wherein Y is a straight-chained or branched alkylene group with 1 to 22 carbon atoms; Z is halogen, pseudohalogen, $SR^1$, $PR^2R^3$, colorant residue or metal complex residue; $R^1$ is H, a straight-chained or branched alkyl group with 1 to 22 carbon atoms or an aryl group with 4 to 10 carbon atoms; and $R^2$ and $R^3$ are identical or different, a straight-chained or branched alkyl group with 1 to 22 carbon atoms, or an aryl group with 4 to 10 carbon atoms. The aerogels are suitable, for example, as catalyst stayes and/or sensors. They can be obtained by metal alcoholates and metal alcoholates in which at least one alcoholate residue is replaced by the —Y—Z group being converted into a lyogel by hydrolysis and condensation, and subsequently being dried.

14 Claims, No Drawings

ORGANOFUNCTIONALIZED AEROGELS

The invention relates to organofunctionalized aerogels, to a process for their preparation, and to their use.

Aerogels are highly porous low-density materials, prepared by forming a gel and subsequently eliminating the liquid with preservation of the gel structure.

According to a narrow definition (see e.g. Gesser and Gaswami, Chem. Rev. 1989, 89, 767) the term aerogel is understood to refer to a material in which the liquid has been removed from the gel under supercritical conditions, whereas, when the gel is dried under subcritical conditions, the resulting product is called a xerogel, and when the liquid is eliminated from the frozen state by sublimation, the product is called a cryogel.

Aerogels within the meaning of the present invention comprise all these materials, and may also contain any gas besides air.

Because of their high porosity, aerogels have interesting physical properties which make them suitable for use, among other things, as heat insulating materials, acoustic materials, luminescent solar collectors, gas filters, catalysts or supporting materials.

For many of these applications, it is desirable to be able to modify the chemical properties of aerogels, e.g. through the incorporation of functional groups.

DE-A 40 02 287 describes functionalized inorganic xerogels. However, under the conditions of preparation indicated therein, no products having a gel structure are obtained, thus the products are not aerogels within the meaning of the present invention.

Aerogels etherified with amino alcohols are described in U.S. Pat. No. 5,270,027. However, such ether bridges do not have a particularly long storage stability, so that a gradual splitting-off of the organic groups takes place.

EP-A 0 629 442 discloses aerogels containing chelated transition metals as catalysts, and Cao and Hunt (Mat. Res. Soc. Symp. Proc. 1994, Vol. 346, 631) describe aminofunctionalized aerogels.

Schubert et al. (Mat. Res. Soc. Symp. Proc. 1994, Vol. 348, 151) have synthesized aerogels containing methacryloxypropyl and glycidoxypropyl groups.

However for the above-mentioned fields of application, there continues to be a demand for additional organofunctionalized aerogels.

Surprisingly, it has now been found that aerogels having (pseudo)halogen, thio and phosphano functions on their inner surface can be prepared without destroying these functional groups or the gel structure during the course of the production process.

Hence the present invention relates to an aerogel which contains functional groups of formula (I),

—Y—Z    (I)

wherein
Y represents a straight-chain or branched alkylene group having 1 to 22, preferably 1 to 12, and, by particular preference, 2 to 3 carbon atoms;
Z represents halogen, preferably Cl, Br or I, and, by particular preference, Cl; pseudohalogen, preferably CN or SCN, $SR^1$, $PR^2R^3$, a dye residue or a metal complex residue;
$R^1$ represents H, a straight-chain or branched alkyl group having 1 to 22, preferably 1 to 12 carbon atoms, or an aryl group having 4 to 10 carbon atoms, and preferably phenyl (Ph) or naphthyl;
$R^2$, $R^3$ are the same of different, and preferably the same, and represent a straight-chain or branched alkyl group having 1 to 22, and preferably 1 to 12, carbon atoms, or an aryl group containing 4 to 10 carbon atoms, and preferably phenyl (Ph) or naphthyl.

In general, the aerogels used are those based on metal oxides suitable for the sol-gel technology (see e.g. C. J. Brinker and G. W. Scherer, Sol-Gel Science, 1990, Chapters 2 and 3), such as Si, Al, Ti, Sn or Zr compounds, or those based on organic substances suitable for the sol-gel technology, such as melamine-formaldehyde condensates (U.S. Pat. No. 5,086,085) or resorcinol-formaldehyde condensates (U.S. Pat. No. 4,873,218). However, they can also be based on mixtures of the aforementioned materials. Used by preference are aerogels containing Si or Al compounds, particularly Si compounds; $SiO_2$ aerogels are particularly preferred.

The aerogels according to the invention preferably contain the functional groups —Y—Z linked directly to the metal, semimetal or carbon component of the aerogel, i.e., for example, to Si, Al, Ti, Sn, Zr or C. As a result, the organic functional group is, preferably, not linked to the aerogel via an oxygen atom.

The aerogels of the invention can be prepared e.g. from mixtures of pure metal alcoholates, particularly of Si, Al, Zr, Ti and Sn alcoholates, and from those in which at least one, preferably an alcoholate group, is replaced by the —Y—Z group. In that case the component containing the —Y—Z group can be added in an amount of up to 60 mole-%. Here, the term "metal alcoholate" includes the corresponding semimetal or even carbon compounds. Preferred are mixtures of tetraalkoxysilanes [$Si(OR)_4$, wherein R represents $C_1$–$C_{12}$-alkyl, preferably methyl or ethyl), and trialkoxysilanes [$(RO)_3Si$—Y—Z, where R represents $C_1$–$C_{12}$-alkyl, and Y and Z have the meanings indicated above].

Both the metal alcoholates used and the organomodified metal alcoholates are commercially available, or can be prepared by methods that are known per se and are familiar to persons skilled in the art.

Such methods are described e.g. in the article "Hybrid Inorganic-Organic Materials by Sol-Gel Processing in Organofunctional Metal Alkoxides" (U. Schubert et al., Chem. Mat. 1995, 7, 2010). Methods of preparation of the preferred organolalkoxysilanes, such as e.g. hydrosilylation of unsaturated compounds followed by alcoholysis;

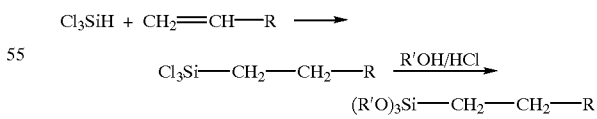

are described, among other places, in W. Noll, Chemie und Technologie der Silicone [Chemistry and Technology of Silicones], Verlag Chemie, Weinheim, 1968, and in U. Deschler, P. Kleinschmit and P. Panster, Angew. Chem. 1986, 98, 237 (Int. Ed. Engl. 1986, 25, 236).

Numerous individual examples are given by E. P. Plueddermann, Silane Coupling Agents, 2nd edition, pp. 31–54, Plenum Press, New York 1991.

Available commercially are e.g. alkoxysilanes $(R'O)_3$—SiR, wherein R stands for bromooctyl, bromophenyl, 3-bromopropyl, 3-butenyl, chloroethyl, chlorophenyl, 3-chloropropyl, 2-(4-chlorosulfonylphenyl)ethyl, 2-cyanoethyl, 3-cyanopropyl, 2-(3-cyclohexenyl)ethyl, diethylphosphanoethyl, (heptafluoroisopropoxy), iodopropyl, 3-isocanatopropyl, 3-mercaptopropyl or 3-thiocyanatopropyl.

Suitable for use as a dye is e.g. the derivative of an NLO dye, which is derived from the parent compound Disperse Red in such a way that the $N(Et)CH_2CH_2OH$ group is replaced by the $N(Et)CH_2CH_2OC(O)NH(CH_2)_3Si(OMe)_3$ group. The preparation of this compound is described in the dissertation of Heinrich Stein, University of Würzburg, 1994, and the preparation of similar derivatives is described e.g. in F. Chaput, D. Riehl, Y. Levy, and J. P Bollot, Chem. Mater. 1993, 5, 589; F. Chaput, J. P. Bollot, D. Riehl and Y. Levy, J. Sol-Gel Sci. Technol. 1994, 2, 779; B. Lebeau, C. Guermeur and C. Sanchez, Mat. Res. Soc. Symp. Proc. 1994, 346, 315; M. Ueda, H. B. Kim, T. Ikeda and K. Ichimura, J. Non-Cryst. Solids 1993, 163, 125; Z. Yang, C. Xu, B. Wu, L. R. Dalton, S. Kalluri, W. H. Steier, Y. Shi and J. H. Bechtel, Chem. Mater. 1994, 6, 1899.

Instead of these or other NLO dyes, it is also possible to use chromophores (functional group Z) for other uses, e.g. fluorescent dyes, pH indicators, photochromic dyes, laser dyes or dyes for aerogel coloring. In all cases a precondition is that the actual dye molecule (=the chromophoric unit) be derivatized with a $(CH_2)_nSi(OR)_3$ unit, in order to assure, in the sol-gel process, a covalent binding of the chromophore to the aerogel structure. The advantage of this method in comparison with a mere insertion of the dye molecule into the aerogel matrix, is that bleeding can be largely or completely prevented. Further examples of usable dye derivatives are described in the article "Hybrid Inorganic-Organic Materials by Sol-Gel Processing of Organofunctional Metal Alkoxides" (K. Schubert et al., Chem. Mater., 1995, 7, 2010).

It is surprising that chromophores may be incorporated in aerogels via covalent bonds, without thereby significantly destroying the aerogel structure, and without destroying the dye molecule under the production conditions.

Suitable for use as metal complex is e.g. the derivative of a catalytically active metal complex, which is derived from the parent compound $Rh(CO)(Cl)(PPh_3)_2$ [sic] in such a way that the $PPh_3$ ligands are replaced by $PPh_2CH_2CH_2Si(OMe)_3$. The preparation of this compound is described by B. E. Mann, C. Masters and B. L. Shaw, J. Chem. Soc. Dalton Trans. 1972, 704.

Instead of this complex, other metal complexes derivatized in a similar manner can also be used. Further examples of usable metal complexes are described in two review articles (U. Schubert, N. Hüsing and A. Lorenz, Chem. Mater. 1995, 7, 2010, and U. Schubert, New J. Chem. 1994, 18, 1049).

It is surprising that metal complexes can be incorporated in aerogels via covalent bonds, without thereby significantly destroying the aerogel structure, and without destroying the metal complex under the production conditions.

To prepare the aerogels according to the invention, a solution of the starting compounds in an organic solvent, preferably in an alcohol such as methanol, ethanol or acetone, is subjected to a sol-gel process that is known per se, as described e.g. in J. Non-Cryst. Solids 1992, 145, 85; J. Sol-Gel Sci. Technol. 1994, 2, 103, or Mat. Res. Soc. Symp. Proc. 1994, 346, 151.

First, lyogels are prepared by hydrolysis and condensation, preferably under basic conditions, e.g. by the addition of the amount of a 0.01 N aqueous $NH_4OH$ solution required for the hydrolysis of the metal alcoholate groups. In so doing, the density of the subsequent aerogels is preferably adjusted to a value of from 50 to 200 $kg/m^3$ through the addition of the solvent. The sol can preferably be after-stirred for a short time, preferably for 5 minutes, to ensure thorough mixing.

After gelling, the gel is preferably aged for a relatively long time, preferably at an elevated temperature, and more preferably below the boiling point of the solvent.

Thereupon the gel is dried by known methods under supercritical or subcritical conditions.

A process for subcritical drying is described e.g. in DE-A 43 16 540.

However, it is preferred to carry out the drying under supercritical conditions. The critical constants for the respective solvent can be obtained from well-known reference tables, e.g. from the Handbook of Chemistry and Physics, 40th edition (1958), pages 2302 to 2304. For example, the critical temperature and critical pressure are, for carbon dioxide, 31.1° C. and 73.0 atm.; for methanol, 240° C. and 78.7 atm.; for ethanol, 243.1° C. and 63.1 atm.; for n-propanol, 263.7° C. and 49,95 atm., and for isopropanol, 235° C. and 53 atm. The drying of the gel under supercritical conditions can be carried out e.g. on the model of EP-A-0 067 741 (=U.S. Pat. No. 4,432,956), and by the process described by U. Schubert et al., J. Non-Cryst. Solids 1995, 186, 37–43.

Supercritical drying in $CO_2$ is particularly preferred, since this operation takes place under relatively sparing conditions.

Alternatively to the above-described process, a gel may be prepared also from metal alcoholates, as described above, and in that case, before drying, the organomodified component is added to the gel e.g. before or during ageing. To speed up the reaction of the organomodified component with the inner surface, heating can optionally be carried out. A catalyst, e.g. an acid or a base, may also be used.

In that case, as described above, the drying can be carried out under supercritical or subcritical conditions.

The aerogels according to the invention are obtained in a monolithic form. They contain the predominant part of the functional groups on the inner surface. They are frequently opaque or transparent. Surprisingly, with halogens such as Cl, and pseudohalogens such as CN, functionalized aerogels are distinguished by a particularly high degree of transparency.

The aerogels according to the invention are suitable for use e.g. in the field of catalysts, e.g. for linking metal ions or metal complexes, or as sensors.

The invention will be explained in greater detail by the following embodiments, without thereby limiting the scope of the invention.

EXAMPLES

The inner surface area of the aerogels was determined by the BET method, following the indications of DIN 66 131.

Example 1

20.55 g (135 mmoles) of tetramethoxysilane and 2.97 g (15 mmoles) of commercially available chloropropyltrimethoxysilane are treated with 13.27 g (414 mmoles) of methanol. For the hydrolysis and condensation, 10.53 g (585 mmoles) of a 0.01 N $NH_4OH$ solution is added to this solution, and the mixture is stirred for 5 minutes. After 30 minutes the mixture is in the form of a lyogel. After aging for 7 days in the closed vessel at 30° C. the lyogel is transferred to an autoclave and dried with $CO_2$ under supercritical conditions (with cooling, 4-day rinsing process: Flow rate 200 mL/min, heating to 40° C. at a rate of 0.25° C./min, pressure up to 100 bar, discharge of the fluid over one day).

At the end of the supercritical drying a transparent aerogel having a density of 251 kg/m$^3$ and an inner surface area of 875 m$^2$/g is obtained.

Example 2

20.55 g (135 mmoles) of tetramethoxysilane and 2.95 g (15 mmoles) of mercaptopropyltrimethoxysilane (obtainable according to U.S. Pat. No. 4,082,790) in 13.21 g (412 mmoles) of methanol are prepared and treated with 10.53 g (585 mmoles) of a 0.01 N $NH_4OH$ solution. After 25 minutes a lyogel is obtained, which, after aging for 7 days at 30° C., is transferred in a closed vessel to an autoclave and dried by means of $CO_2$ under supercritical conditions, as in Example 1.

In this way and aerogel having a density of 265 kg/m$^3$ and an inner surface area of 654 m$^2$/g is obtained.

Example 3

16.89 g (111 mmoles) of tetramethoxysilane and 4.06 g (12 mmoles) of diphenylphosphinoethyltrimethoxysilane (obtainable according to Niebergall, Makromol. Chem. 1962, 52, 218) are placed in 16.53 g (516 mmoles) of methanol, and treated with 8.64 g (480 mmoles) of a 0.01 N $NH_4OH$ solution. After 15 minutes a lyogel is obtained which, after aging for 7 days as described in Example 1, is dried under supercritical conditions. A white aerogel having a density of 238 kg/m$^2$ and an inner surface area of 624 m$^2$/g is obtained.

Example 4

12.18 g (80 mmoles) of tetramethoxysilane and 0.24 g (0.42 mmole) of the dye

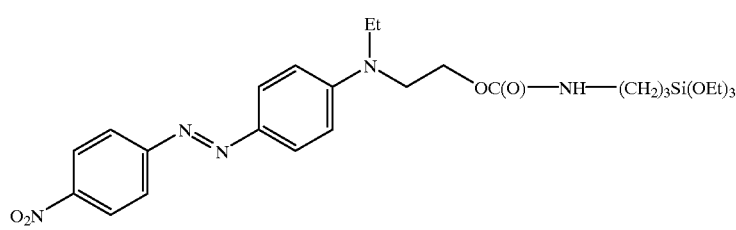

are dissolved in 25.59 g (799 mmoles) of methanol, and treated with 5.76 g (320 mmoles) of a 0.01 N $NH_4OH$ solution. After 6 to 7 hours a lyogel is obtained, which, after aging for 7 days as described in Example 1, is dried under supercritical conditions. In this way a dark-red aerogel having a density of 156 kg/m$^3$ is obtained.

Example 5

25.11 g (165 mmoles) of tetramethoxysilane and 0.36 g (0.41 mmoles) of the metal complex trans-Rh(CO) (Cl) $[PPh_2CH_2CH_2SI(OMe)_3]_2$ [sic] are dissolved in 10.83 g (338 mmoles) of methanol and treated with 11.93 g (663 mmoles) of a 0.01 N $NH_4OH$ solution. After 40 minutes a lyogel is obtained, which, after aging for 7 days as described in Example 1, is dried under supercritical conditions. In this way a pale yellow aerogel having a density of 304 kg/m$^3$ is obtained.

What is claimed is:

1. An aerogel, containing functional groups of formula (I)

—Y—Z            (I)

wherein the functional groups —Y—Z are bound directly to silicon atoms, and

Y represents a straight-chain or branched alkylene group having 1 to 22 carbon atoms;

Z represents halogen, pseudohalogen, $SR^1$, $PR^2R^3$, a dye residue or a metal complex residue;

$R^1$ represents H, a straight-chain or branched alkyl group having 1 to 22 carbon atoms or an aryl group having 4 to 10 carbon atoms; and $R^2$ and $R^3$ are the same or different and represent a straight-chain or branched alkyl group having 1 to 22 carbon atoms or an aryl group having 4 to 10 carbon atoms.

2. An aerogel according to claim 1, characterized in that it is an $SiO_2$ aerogel.

3. An aerogel according to claim 1, characterized in that the symbols in Formula (I) have the following meanings:

Y is a straight-chain or branched alkylene group having 1 to 12 carbon atoms;

Z is Cl, Br or I, CN, SCN, $SR^1$ or $PR^2R^3$;

$R^1$ is H, a straight-chain or branched alkyl group having 1 to 12 carbon atoms, phenyl or napthyl; and $R^2$ and $R^3$ are the same or different and represent a straight-chain or branched alkyl group having 1 to 12 carbon atoms, phenyl or napthyl.

4. An aerogel according to claim 1, characterized in that the symbols in Formula (I) have the following meanings:

Y is a straight-chain alkylene group having 2 to 3 carbon atoms; and

Z is Cl, SH or —$PPh_2$.

5. An aerogel according to claim 1, characterized in that it contains the —Y—Z group in an amount of up to 60 mole-% calculated on the silicon atoms.

6. A process for the preparation of organofunctionalized aerogels according to claim 1, characterized in that pure metal alcoholates and metal alcoholates in which at least one alcoholate group is replaced by the —Y—Z group, are converted by hydrolysis and condensation into a lyogel, and then dried.

7. A process according to claim 6, characterized in that the component containing the —Y—Z group is added in an amount of up to 60 mole-%.

8. A process according to claim 6, characterized in that tetraalkoxysilanes of formula $Si(OR^3)_4$ and trialkoxysilanes of formula $(R^4O)_3Si$—Y—Z, where $R^3$ and $R^4$ are $C_1$–$C_{12}$ alkyl groups and the other symbols have the same meanings as in formula (I), are converted to an organomodified $SiO_2$ aerogel.

9. A process according to claim 6, characterized in that the lyogel is aged before drying.

10. A process according to claim 6, characterized in that the drying is carried out under supercritical conditions.

11. A process according to claim 10, wherein the supercritical drying is carried out in $CO_2$.

12. In a process for producing a catalyst, the improvement which comprises adding an organofunctionalized aerogel according to claim 1 as a precursor.

13. In a method for detecting compounds, the improvement which comprises utilizing a organofunctionalized aerogel according to claim 1 as a sensor.

14. A sensor for chemicals which comprises an aerogel according to claim 1.

* * * * *